United States Patent [19]

Goodman

[11] Patent Number: 4,989,884
[45] Date of Patent: Feb. 5, 1991

[54] AUTOMOTIVE BOOT

[76] Inventor: Clarence R. Goodman, 10827 W. Ruth, Peoria, Ariz. 85345

[21] Appl. No.: 322,539

[22] Filed: Mar. 13, 1989

[51] Int. Cl.$^5$ .................. B61F 15/22; F16J 15/50; F16J 15/52
[52] U.S. Cl. ........................ 277/31; 74/18.2; 188/322.22; 277/88; 277/178; 277/183; 277/200; 277/212 FB; 403/51
[58] Field of Search .............. 277/88, 212 FB, 178, 277/DIG. 4, 31, 183, 184, 189, 200; 267/64.23, 64.27, 64.19, 122; 188/322.22; 74/18, 18.2; 403/50, 51, 288

[56] References Cited

U.S. PATENT DOCUMENTS

| | | | |
|---|---|---|---|
| 2,577,292 | 12/1951 | Weber | 277/88 |
| 4,447,066 | 5/1984 | Katagiri et al. | 277/212 FB |
| 4,529,213 | 7/1985 | Goodman | 277/212 FB |
| 4,615,512 | 10/1986 | Hoke | 403/51 X |
| 4,819,919 | 4/1989 | Taylor | 277/212 FB |
| 4,832,161 | 5/1989 | Weiler et al. | 74/18.2 X |
| 4,844,486 | 7/1989 | Schiemann | 277/212 FB |

Primary Examiner—Allan N. Shoap
Assistant Examiner—Scott Cummings
Attorney, Agent, or Firm—Cahill, Sutton & Thomas

[57] ABSTRACT

A protective accordion configured tubular boot has one end fixedly secured to and sealed about the cylinder of a shock absorber and the boot extends upwardly about a plunger protruding from the cylinder. The other end of the boot includes an inwardly extending radial flange having a plurality of circular concentric ridges disposed on opposed sides. An outwardly radially extending channel fixedly secured proximate the end of the plunger receives the radial flange to form a floating vented seal at the other end of the boot to prevent particulate matter and liquids from entering the boot.

15 Claims, 1 Drawing Sheet

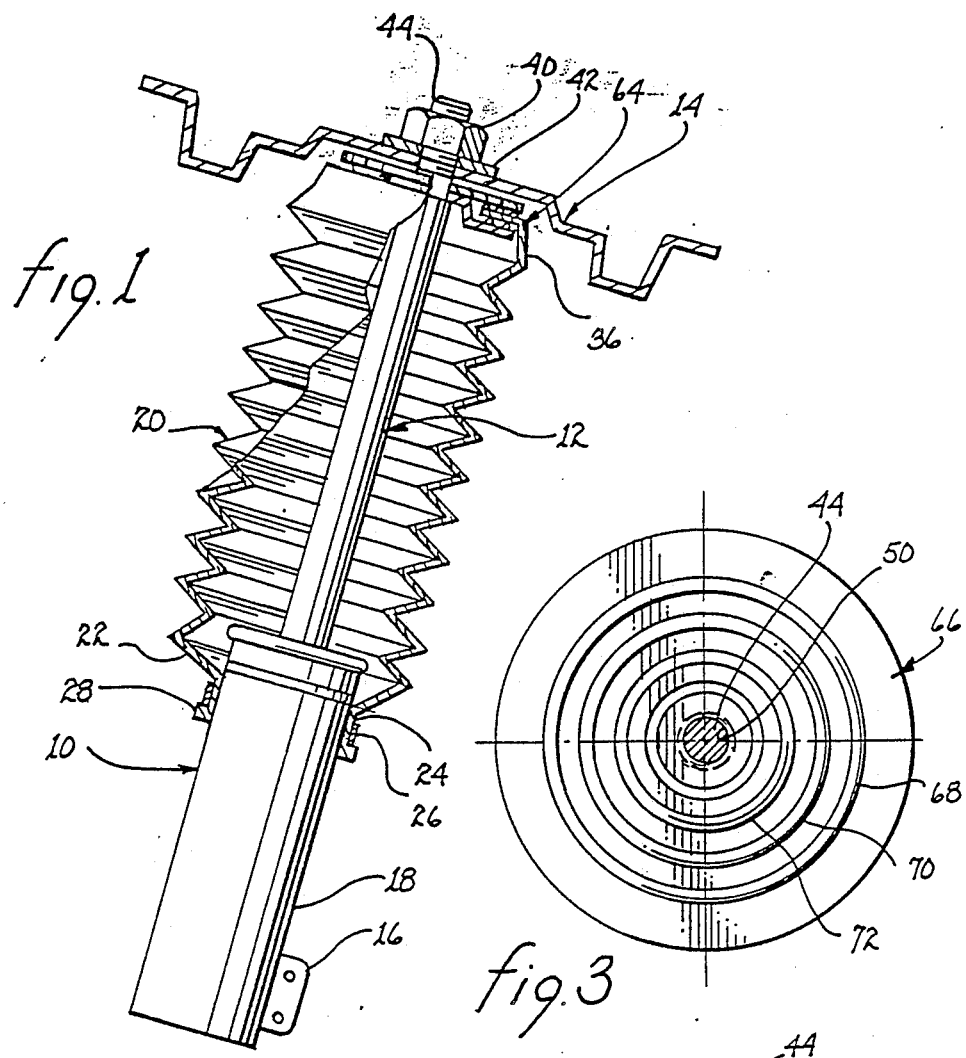
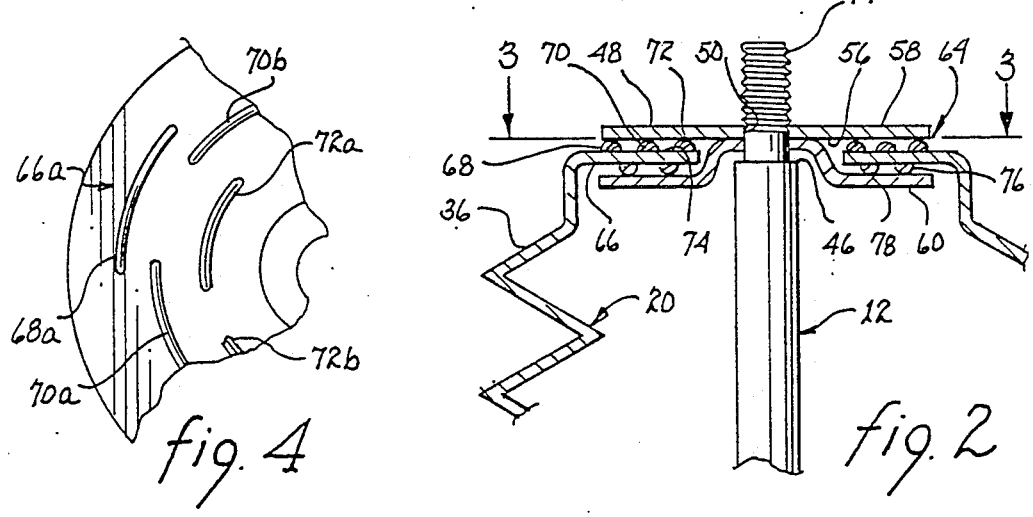

4,989,884

AUTOMOTIVE BOOT

BACKGROUND OF THE INVENTION

1. Field of the Invention

The present invention relates to automotive boots and, more particularly, to a boot having a fixed end and a floating end to seal an encircled element against foreign matter while accommodating axial translation and limited rotational and pivotal movement between the fixed and floating ends.

2. Description of the Prior Art

Tube like flexible boots have been used in various automotive, industrial and other applications to protect extensible members from environmental contaminants. Often, the extensible members effect a combination of axial and rotational movements between the elements to which they are attached. In such prior applications, both ends of the boot may be fixedly attached to the respective encircled shaft and housing to form a seal. Similarly, boots used to protect the junction between telescoping members where there is no relative rotational or pivotal movement between the members, may be fixedly secured at both ends. However, when both ends of a boot are fixedly secured to two elements which reciprocally rotate with respect to one another, substantial twisting stresses are imposed upon the boot and its lifespan is a function of the ability of the boot material to withstand the stresses imposed. When there is compression and expansion of the boot in combination with a twisting motion, the boot will fatigue more rapidly or not function at all. A boot split or torn as a result of fatigue induced non compliance will expose the protected elements to foreign matter and thus defeat the purpose for which a boot was installed. Such exposure will quickly cause corrosion and damage with a possible resulting failure of the elements and jeopardy to operability of the vehicle. These problems are particularly prevalent in automotive applications in general and for MacPherson struts in particular.

Various mechanisms have been developed in an attempt to float one end of a boot to accommodate relative rotational and pivotal movement between the points of attachment of the ends of the boot. In one embodiment of a boot, a radially inwardly oriented channel is formed in a floating end of the boot for receiving the edge of a disk like element. To accommodate rotation, the channel must be in sufficiently loose engagement with the disk to permit rotation of the boot about the disk and avoid translation of twisting forces upon the boot. In practice, it has been found that to avoid twisting sufficient looseness of the fit must exist which fit will permit particulate matter and liquids to enter the boot through the floating end. In another embodiment, one end of the boot is rigidly secured to a collar. The collar includes a radially inwardly oriented channel for receiving an annular ridge in sliding engagement. To prevent unwanted restraint of rotational movement of the channel relative to the ridge, a substantial space therebetween must be provided, which space is also sufficient to prevent a substantial inflow of particulate matter and liquid into the boot. Modified versions of such radially inwardly oriented channels cooperating with radially extending ridges or disks have also been employed. In each of such configurations, a common problem is present. A certain amount of radially oriented space must exist to permit sufficient segregation and lack of frictional resistance to permit independent rotation therebetween. Since the radial width of this space is a function of the sealing capability of the interconnection, a dichotomy exists. Either the radial space must be sufficient to permit independent relative rotation between the parts, in which case an inflow of particulate matter and liquid occurs or the radial space must be minute enough to provide a seal against intrusion of particulate matter and liquids, in which case independent relative rotation between parts is inhibited. Furthermore, looseness of the fit will be noisy during operation of the vehicle, which noise is unacceptable. A further ongoing problem with boot designs in general is that of providing a means for air outflow and inflow as the boot compresses and extends.

SUMMARY OF THE INVENTION

One end of a tube like accordion shaped flexible boot is secured to the cylinder of a shock absorber. The other end of the boot is secured to a point proximate the end of a plunger extending from the cylinder with a floating point of attachment to accommodate axial displacement of the plunger and relative rotation between the plunger and the cylinder. The floating point of attachment includes a radially inwardly oriented flange formed in the boot, which flange includes a plurality of concentric ridges disposed on opposed sides. A plunger associated radially outwardly oriented channel receives and maintains the flange. A seal between the channel and ridges is formed by the ridges exerting pressure axially upon opposed sides of the channel.

It is therefore a primary object of the present invention to provide a floating attachment for providing a measure of sealing for one end of a boot while permitting air outflow and inflow as the boot member compresses and extends and yet permitting rotational movement between elements of the boot protected extensible member.

Another object of the present invention is to provide apparatus for attaching a boot to protect the junction between two elements which are axially and rotationally displaceable with respect to one another.

Still another object of the present invention is to provide an effective seal against intrusion of foreign matter into a boot having one fixed end and a floating end.

Yet another object of the present invention is to provide a seal between a boot and an element rotatable with respect thereto which is a function of opposed axially oriented forces.

A further object of the present invention is to provide a floating seal between one end of a boot and a rotating element which seal accommodates radial displacement of the sealed end of the boot without affecting the integrity of the seal.

A still further object of the present invention is to provide a boot for effectively sealing a MacPherson strut of a vehicle.

A yet further object of the present invention is to provide a low noise floating seal between a non rotating boot and a rotating and axially displaceable element.

A yet further object of the present invention is to provide a means for exchanging air out of and into a boot as the boot compresses and extends.

These and other objects of the present invention will become apparent to those skilled in the art as the description thereof proceeds.

BRIEF DESCRIPTION OF THE DRAWINGS

The present invention will be described with greater clarity and specificity with reference to the following drawings, in which:

FIG. 1 illustrates a floating boot seal incorporated with an automotive suspension element of the type sometimes referred to as a MacPherson strut;

FIG. 2 is a partial cross sectional view illustrating the floating boot seal;

FIG. 3 is a cross sectional view taken along line 3—3, as shown in FIG. 2; and

FIG. 4 is a partial view showing a variant configuration of the ridges on the flange.

DESCRIPTION OF THE PREFERRED EMBODIMENT

A MacPherson strut is a particular strut used as part of the front end suspension system of certain automotive vehicles. This strut is, in essence, a shock absorber mounted and oriented in a particular relationship which results in both axial displacement of the plunger with respect to the cylinder and incremental rotation of the plunger about its axis with respect to the cylinder. Foreign matter, whether particulate or liquid, disposed upon the plunger will tend to corrode the plunger and will affect the seal between the plunger and the cylinder. Moreover, particulate matter forced between the plunger and the cylinder will cause scoring and will damage the seals of the cylinder and render the shock absorber functionally inadequate. It is therefore mandatory that the plunger be protected in an effective manner. Because any shroud or boot disposed about the plunger must be capable of accommodating not only axial displacement of the plunger but also rotational displacement of the plunger relative to the cylinder while providing an effective seal against particulate matter and liquid, a severe problem has existed. Finally, the seal must not clatter or otherwise be noisy.

Referring to FIG. 1, there is shown, in representative form, a MacPherson strut 10. The strut in one sense functions in the manner of a coil spring encircling a conventional shock absorber to suspend the automobile frame and body while dampening the relative movement between two interconnected parts. However, because of its position and angular orientation along with the associated suspension components, it is identified by the name of the inventor of this type of suspension. The MacPherson strut, or shock absorber, includes a plunger 12 secured to an element 14 of the automotive chassis. A tab 16, or like element, may be used to attach the strut body or cylinder 18 to an arm of a wheel supporting assembly. The coil spring and coil spring supporting elements normally used with a MacPherson strut are not shown for reasons of clarity; moreover, further elements associated with the suspension system but not a part of the present invention have been omitted for the sake of clarity.

A boot 20 is a flexible tube like element having an accordion like round wall to accommodate axial compression and extension. Fixed end 22 of the boot includes a cylindrical section 24 sized to circumscribe cylinder 18 in contacting relationship. A band 26 encircles the cylindrical section to compressively maintain the cylindrical section fixed to cylinder 18 in sealed relationship. A bead or lip 28 may be employed to discourage withdrawal of the cylindrical section from within band 26. Thereby, lower end 22 of boot 20 is affixed to cylinder 18 in sealed relationship.

Referring jointly to FIGS. 1, 2 and 3, the floating attachment point of upper end 36 of boot 20 will be described. A nut 40, in combination with a washer 42, threadedly engages threaded section 44 of plunger 12 to secure the plunger to chassis element 14. Plunger 12 may include a shoulder 46 for this purpose. A member 48 includes an aperture 50 for penetrably receiving threaded section 44 of plunger 12. Upon tightening of nut 40, member 48 is drawn against the under surface of chassis element 14 by shoulder 46 bearing against the member. It is to be understood that other mechanisms for attaching member 48 as well as the location of the member with respect to the chassis element or the plunger may be varied or otherwise modified.

Member 48 includes a radially outwardly oriented channel 56. This channel may be formed by the combination of a disk 58 secured to a circular offset element 60. Alternatively, it may be a single piece pulley like element having a deep annular channel.

Upper end 36 of boot 20 includes a radially inwardly oriented flange 66 positionable within channel 56. Preferably, the interior radius of flange 66 is greater than the minimum radius of channel 56 to permit upper end 36 of the boot to be displaced laterally to a certain extent without contact with the inner extremity of the channel.

A seal 64 between upper end 36 and member 48 is provided by a plurality of concentric ridges 68, 70 and 72 disposed upon exterior surface 74 of the flange and a further plurality of concentric ridges 76, 78 disposed upon interior surface 80 of the flange. These ridges are dimensioned to bear against the respective radial walls of channel 56 and create a seal therewith. The cross section of the ridges may be semicircular, triangular, rectangular or of any other configuration.

It may be noted that radial excursion of upper end 36 relative to the axis of plunger 12 will result in the ridges being displaced radially inwardly with respect to one part of the channel but radially outwardly with respect to the diametrically opposed part of the channel. Any such displacement, to the extent accommodated by the radial dimension of flange 66 and the innermost wall of the channel, will have no effect upon the sealing engagement between the ridges and the respective radial walls of the channel. It will therefore become evident that the integrity of the seal between upper end 36 of the boot and member 48 is not a function of any radially oriented force therebetween. Instead, the sealing effectiveness is a function of the degree of axial compression between the radial walls of channel 56 and the engaged ridges. Because the line of contact between each of the ridges and the respective radial wall can be very narrow, only a very small amount of force is required to produce a high sealing pressure. Thus, the amount of friction between member 48 and boot 20 due to rotational displacement therebetween about the axis of plunger 12 will be minimal. There will therefore exist a tendency for upper end 36 of the boot not to rotate relative to member 48 in response to relative rotation between cylinder 18 and plunger 12. The effective lack of rotational movement of upper end 36 of boot 20 with respect to fixed end 22 will minimize the stresses imposed upon the boot due to relative rotation between the fixed end and the upper end; and, the useful life of the boot will be enhanced.

Because upper end 36 of the boot is in ongoing and continuing contact with element 48, there will be little noise producing motion therebetween. Accordingly, the floating interconnection is relatively quiet and essentially unnoticeable to an occupant of the vehicle.

While flange 66 is illustrated and described as being oriented radially inwardly, it is to be understood that the flange could be radially outwardly oriented. In such case, member 48 would be adapted to provide a radially inwardly extending channel to receive the flange. By incorporating the concentric ridges discussed above in such radially oriented flange, the sealing effectiveness described above would be maintained. A further consideration for the effectiveness of the seal is that of the spacing between the planar surfaces of flange 66 and the opposing radial sides of channel 56.

Since the combination of flange 66 and channel 56 provides a convoluted path into upper end 36 of the boot, a deterrent to flow of particulates and liquids into the boot exists. Because of such preexisting deterrent, a sufficient seal may be effected even if the ridges are segmented, instead of continuous, and whether such segmented ridges are overlapping or not.

FIG. 4 illustrates a variant flange 66a having segments 68a, 70a, 70b, 72a and 72b of ridges 68, 70 and 72 formed thereon. These segments are in radially aligned overlapping relationship and provide a clear airway into and out of boot 20 for venting purposes. However, the segments contribute to the convoluted passageway into and out of the boot and restrain flow of particulate matter and liquid therepast.

As boot 12 compresses and extends in response to the protected MacPherson strut or extensible member, air must be permitted to flow out of and into the boot. A vent for this purpose can be provided by seal 64. That is, by appropriate dimensioning of ridges 68, 70, 72, 76 and 78 with respect to the corresponding radial walls of channel 56, sufficient space can be provided for air flow therebetween and venting of the boot. Even though the resulting seal will not prevent gaseous flow therepast, the convoluted pathway provided by the flange within the channel and the ridges extending from the flange will be very effective in precluding particulate matter or fluids from passing therepast. Should the ridges be segmented as discussed above and whether or not radially overlapped, venting for the airflow into and out of the boot will be provided.

From the above description it will be apparent that boot 12, due to its accordion like wall, can accommodate axial displacement between the two points of attachment. Moreover, it is well known that the accordion like wall of the boot will accommodate at least a limited degree of lateral displacement between the two points of attachment. The floating seal engagement of one end described above accommodates relative rotation between the points of attachment of the opposed ends of the boot without imposing a like degree of rotation on twisting of the boot. Accordingly, the configuration of boot 12 and the structure for attaching the opposed ends thereof, as described above, can and will accommodate rotational displacement as well as axial and lateral displacement between the points of attachment at the opposite ends of the boot.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirements without departing from those principles.

I claim:

1. A rotatable seal for an end of an automotive boot disposed about a strut, said seal comprising in combination:
   (a) a radial flange;
   (b) a radial channel having a greater radially oriented depth than axially oriented width for receiving said radial flange, said radial channel and said radial flange being dimensioned to accommodate rotation of said radial flange within said radial channel;
   (c) means for interconnecting the end of the boot and the strut with said radial channel and said radial flange; and
   (d) means for developing a seal between said radial flange and said radial channel, said developing means including means extending axially intermediate said radial flange and said radial channel.

2. A rotatable seal for an end of an automotive boot disposed about a strut, said seal comprising in combination:
   (a) a radial flange extending from the end of the boot;
   (b) a radial channel extending from the strut for receiving said radial flange, said radial channel and said radial flange being dimensioned to accommodate rotation of said radial flange within said radial channel; and
   (c) means for developing a seal between said radial flange and said radial channel, said developing means including means extending axially intermediate said radial flange and said radial channel.

3. The rotatable seal as set forth in claim 1 wherein said radial channel and said radial flange are radially dimensioned to accommodate radial displacement of said radial flange relative to said radial channel while in engagement with said radial channel.

4. A rotatable seal for an end of an automotive boot disposed about a strut, said seal comprising in combination:
   (a) a radial flange extending from the end of the boot;
   (b) a radial channel extending from the strut for receiving said radial flange, said radial channel and said radial flange being dimensioned to accommodate rotation of said radial flange within said radial channel and to accommodate radial displacement of said radial flange relative to said radial channel while in engagement with said radial channel; and
   (c) means for developing a seal between said radial flange and said radial channel, said developing means including means extending axially intermediate said radial flange and said radial channel.

5. The rotatable seal as set forth in claim 1 wherein said extending means includes ridge means extending axially from opposed sides of said radial flange.

6. The rotatable seal as set forth in claim 5 wherein said ridge means includes at least one annular ridge disposed on each side of said radial flange.

7. A rotatable seal for an end of an automotive boot disposed about a strut, said seal comprising in combination:
   (a) a radial flange extending from either the strut or the end of the boot;
   (b) a radial channel extending from the other of the strut and the end of the boot for receiving said radial flange, said radial channel and said radial flange being dimensioned to accommodate rotation of said radial flange within said radial channel; and (c) means for developing a seal between said radial flange and said radial channel, said developing means including ridge means extending axially from opposed sides of said radial flange, said ridge means including a plurality of concentric annular ridges disposed on each side of said radial flange.

8. The rotatable seal as set forth in claim 5 wherein said radial channel and said radial flange are radially dimensioned to accommodate radial displacement of said radial flange relative to said radial channel while in engagement with said radial channel.

9. A rotatable seal for an end of an automotive boot disposed about a strut, said seal comprising in combination:
   (a) a radial flange extending from the end of the boot;
   (b) a radial channel extending from the strut for receiving said radial flange, said radial channel and said radial flange being dimensioned to accommodate rotation of said radial flange within said radial channel and to accommodate radial displacement of said radial flange relative to said radial channel while in engagement with said radial channel; and
   (c) means for developing a seal between said radial flange and said radial channel, said developing means including ridge means axially extending from opposed sides of said radial flange.

10. A rotatable seal for an end of an automotive boot disposed about a strut, said seal comprising in combination:
    (a) a radial flange extending from either the strut or the end of the boot;
    (b) a radial channel extending from the other of the strut and the end of the boot for receiving said radial flange, said radial channel and said radial flange being dimensioned to accommodate rotation of said radial flange within said radial channel;
    (c) means for developing a seal between said radial flange and said radial channel, said developing means including means extending axially intermediate said radial flange and said radial channel.

11. The rotatable seal as set forth in claim 10 including venting means disposed as a part of said seal.

12. Apparatus for shielding an automotive strut having a cylinder and a plunger extendable from the cylinder and which plunger may rotate about its longitudinal axis with respect to the cylinder, said boot comprising in combination:
    (a) a boot for encircling and shielding the junction between the cylinder and the plunger, said boot having a tube like configuration with a first end and a second end;
    (b) means for securing the first end of said boot about said cylinder in a sealed relationship;
    (c) a radial flange disposed at the second end of said boot;
    (d) a radially oriented channel disposed about the plunger for receiving said radial flange and for accommodating rotation of said radial flange within said channel upon relative rotation between the plunger and said boot, said channel having opposed surfaces operatively associated with axially extending sealing projections on said radial flange to form a vented seal between each of the opposed surfaces of said channel and said radial flange.

13. Apparatus for shielding an automotive strut having a cylinder and a plunger extendable from the cylinder and which plunger may rotate about its longitudinal axis with respect to the cylinder, said apparatus comprising in combination:
    (a) a boot for encircling and shielding the junction between the cylinder and the plunger, said boot having a tube like configuration, a first end, a second end and an accordion like wall extending between the first and second ends;
    (b) means for securing the first end of said boot about the cylinder in a sealed relationship;
    (c) a radial flange disposed at the second end of said boot;
    (d) a radially oriented channel disposed about the plunger for receiving said radial flange and for accommodating rotation of said radial flange within said channel upon relative rotation between the plunger and said boot, said channel having opposed surfaces operatively associated with axially extending sealing projections on said radial flange to form a vented seal.

14. Apparatus for shielding an automotive strut having a cylinder and a plunger extendable from the cylinder and which plunger may rotate about its longitudinal axis with respect tot he cylinder, said apparatus comprising in combination:
    (a) a boot for encircling and shielding the junction between the cylinder and the plunger, said boot having a tube like configuration with a first end and a second end;
    (b) means for securing the first end of said boot about said cylinder in a sealed relationship;
    (c) a radial flange disposed at the second end of said boot, said radial flange including an annular ridge disposed on each side of said radial flange;
    (d) a radially oriented channel disposed about the plunger for receiving said radial flange and for accommodating rotation of said radial flange within said channel upon relative rotation between the plunger and said boot, said channel having opposed surfaces operatively associated with said annular ridges to form a vented seal between each of the opposed surfaces of said channel and said radial flange.

15. The apparatus as set forth in claim 12 wherein said ridge means includes a plurality of concentric annular ridges disposed on each side of said radial flange.

* * * * *